Patented Oct. 12, 1954

2,691,615

UNITED STATES PATENT OFFICE 2,691,615

AIR TREATING GEL

William D. Turner and Elizabeth T. Rasko, New York, N. Y., assignors to Airkem, Inc., New York, N. Y., a corporation of New York No Drawing. Application August 9, 1950, Serial No. 178,508

5 Claims. (Cl. 167—24)

This invention relates to air treating gels wherein readily volatilizable air treating constituents in aqueous medium are solidified by means of a small amount of aqueous gelling agent. More particularly the invention relates to air treating gels of the character described which are free of syneresis and have the characteristic property of emitting vapors of substantially uniform quality evaporation of the gels; and to certain adaptations wherein a body of gel is segmented to expose fresh surfaces during evaporation so that the uniform quality vapors are emitted at a substantially uniform rate.

A treatment of air in occupied spaces has been effected for some time previously by contacting such air with an air treating composition in which the contact was brought about by means of wick bottles, wick floats, sponges, cartridges, constant level pools, thermal evaporators and the like which were placed in the space or stream of air being treated. These various procedures, however, have certain limitations as, for example, where the treatment is in liquid form the control of the rate of evaporation requires careful attention since, otherwise, a desirable rate of evaporation will not ensue. This has been found to be especially so with a liquid in a wide type of dispenser.

There is also a further limitation or disadvantage inasmuch as there will be a tendency to differential evaporation rates of the various constituents of the composition, unless the constituents are present in azeotropic proportions and, consequently, the composition of the first portion of vapor may be distinctly different from that of the last portion.

Air treating gels in accordance with the present invention overcome the difficulties above mentioned and provide a new and effective means for introducing uniform quality vapor mixtures into air and can be employed with various types and kinds of air treating formulations as hereinafter described. With the special adaptations of the new air treating gels hereinafter referred to as segmented or discontinuous gels, the cutting or segmenting of a body of gel causes fresh surfaces to be exposed as the gel is consumed through evaporation thereby providing means for obtaining a substantially uniform rate of emission of uniform quality vapors during the life of the gel i. e. the period required for substantially complete evaporation of volatile components.

In the practice of the invention, an air treating gel may be produced consisting essentially of a liquid e. g. aqueous medium in a major proportion containing a plurality of substances, which may be either liquid or solid, volatilizable at room temperatures, i. e., 65°–80° F., and a gelling agent in a minor proportion, preferably such as will form an irreversible gel, with the gel being substantially devoid of syneresis and the quality of the vapor arising therefrom being substantially constant during volatilization. When such a gel is cut or segmented as more fully hereinafter described the resulting discontinuity gives increased surface area as volatilization proceeds, so that the rate of evaporation curve, weight-time, is substantially a straight line, i. e., the curve varies from a straight line only during the initial and final periods.

The volatilizable substances may be selected from the group consisting of aliphatic, especially monohydric, alcohols and aliphatic aldehyde compounds having a carbon content of $C_2$–$C_{20}$. Somewhat more particularly, the volatilizable substance may be selected from the group consisting of acetaldehyde, paraldehyde, an acetal, 2-hexene-1-al, betahexyl acrolein and phenyl acetaldehyde. Other compounds that may be utilized are the following: caproaldehyde, crotonaldehyde, ethyl acrolein, bromals, as $CBr_3CHO$, chlorals, as $CCl_3CHO$, and halogenated acetals. It will be understood that the term "acetal" includes also the ketals, that is, compounds formed in an analogous manner from ketones and aldehydes, whereas the acetals are formed by reaction between an aldehyde and an alcohol.

Additional compounds that may be utilized are 3 - hexene - 1 - ol, 2,4 - nonadiene - 1 - ol, 2 - 6 - nonadiene-1-al, paratolyl acetaldehyde, phenoxy acetaldehyde, betapropyl acrolein, betabutyl acrolein, betaamyl acrolein, phytol, hexadienal, and betaphenyl amyl acrolein. It will be realized that the various compounds may be employed either alone or in compatible combinations, and it may be added that the employment of chlorophyll therewith leads to a marked improvement in the qualities of the composition when utilized for freshening vitiated air in a confined space.

Moreover, the proportions in which the above compounds may be present are subject to variation as from about 0.03% to about 0.5%, and more particularly from 0.1% to 0.25%. The concentration will, of course, be governed by the properties of the compound or combination of compounds being utilized. Further, the amount or concentration of chlorophyll may be from about 0.1% to about 0.4%, with satisfactory results having been obtained with a concentration of about 0.2%. The contacting of air therewith may be brought about by causing the air to flow over the composition placed in a suitable manner. There may also be included various aromatic constituents or essential oils, such as oil of pine, oil of lemon grass, oil of spearmint and the like.

The gelling agent may be one which forms either a reversible or an irreversible gel, such as an alginate and a nitrocellulose of the pyroxylin type, that is, one having a nitrogen content from about 10.8% to 11.6%. Other gelling agents that may be employed are gelatin, pectin, agar-agar, a gum, such as karaya and gum tragacanth, starch, and the like. Further, the gelling agent may be present in an amount from about 1.0% to about 4.0%, suitably about 1.5%, and, in general, the amount of gelling agent should be such as to yield a firm gel substantially devoid of syneresis. The liquid medium serving as a solvent or a vehicle for the volatilizable substances may be an aqueous medium in a major proportion.

The foregoing method in conjunction with the compositions set forth leads to a marked improvement in the condition of air, particularly of that in a confined space. It has been found that the ingredients above mentioned when dispersed into air impart an invigorating quality thereto, and have a distinctive effect upon the air and upon those breathing such air.

A particular field for utilization of the method and the composition and one to which it is well adapted is air conditioning. Frequently, the air in air conditioning systems acquires a peculiar stale character, and this may be due to odors of "below threshold value," that is, odors which have such a low intensity that the individual receives no positive odor impression. However, even when of low intensity, they may have a depressing effect which is offset by treating air in accordance with the procedure and with the compositions set forth herein.

Further, it has been found that odors present in air conditioning systems whether noticeable or not are due at least in part to bacteria and molds which develop in the solid deposits on gaskets, filters, duct walls, drip pans, and drains in the absence of natural light and which due to a putrefactive action give off an unpleasant odor.

As an illustrative embodiment of a manner in which the invention may be practiced, the following examples are presented. The parts are by weight, and a typical air freshening formulation is the following:

| | Parts |
|---|---|
| Oil of pine | 75 |
| Acetaldehyde | 4 |
| Chlorophyll—commercial containing 10% active chlorophyll as determined by standard method 6.60 of the "Official Methods of Analysis of the Association of Official Agricultural Chemists," Seventh Edition (1950) | 17 |

*Example 1*

To 100 parts of an aqueous dispersion of the air freshening formulation in the relative proportions of 10:1 (water: formulation), there may be added about 1 part of agar-agar while heating to a temperature of at least 40° C. The liquid mass is then poured into a suitable container, wherein it is permitted to cool and upon cooling it sets into gel form. The gel so produced may be used as such or may be comminuted, as by dicing or granulating if desired. Alternatively the body of gel may be segmented by cutting or slicing as with a knife or other sharp instrument, or by means of a cutter of suitable shape and size, whereby the desired number of segments and contour will be produced.

*Example 2*

19 parts of agar-agar are mixed with about 831 parts of water. The mixture is heated until a smooth mass is obtained, whereupon it is permitted to cool to about 55° C., and there is then added about 100 parts of the air freshening formulation. The composition thus obtained is stirred vigorously and then poured into a suitable mold or form. When the mass cools, it sets to a gel and this occurs usually within a few minutes. The prepared gel may then be segmented as in Example 1.

*Example 3*

A composition may be prepared as in Example 2, utilizing about 2% of gelatin in place of the agar-agar.

*Example 4*

The composition may be produced with the following constituents in the proportions given:

| | Parts |
|---|---|
| Sodium alginate | 1 |
| Sodium tetraphosphate (Quadruphos) | 0.05 |
| Tricalcium phosphate | 0.15 |
| Citric acid | 0.40 |
| Air freshening formulation | 10.0 |
| Water | 88.4 |

The alginate and the tetraphosphate are dissolved in the water and the air freshening formulation added thereto with continuous stirring. The tricalcium phosphate may now be introduced and this is followed by the addition of the citric acid. It has been found that the foregoing quantities bring about gelation in about an hour, thus providing ample time for pouring the liquid mass into desired molds or forms in which it solidifies or sets to a permanent irreversible gel. The gel may then be segmented as in Example 1.

Moreover, in the foregoing example the alginate is caused to solidify by the calcium salt. It will be realized that other salts having the property of bringing about solidification of the alginate may be employed and more especially barium, strontium and magnesium compounds. Further, these compounds preferably are those of limited solubility, as calcium sulfate, strontium sulfate and magnesium hydroxide. The foregoing compounds may be employed in an amount from about 0.1% to about 1.0%, and desirably about 0.15%.

The sodium tetraphosphate serves as a gel retarding agent inasmuch as it acts as a sequestering agent for the calcium, for example, i. e., it permits a gradual release of calcium ions, which in turn react with the alginate to form the compound which produces the gel. In addition to the sodium tetraphosphate, other soluble sodium, potassium and ammonium compounds may be employed as gel retarders, as various poly-, meta- and pyrophosphates. Moreover, they may be utilized in amounts ranging from about 0.02% to about 0.2%, preferably about 0.05%.

The utilization of the citric acid in connection with the alginate is to furnish hydrogen ions, and the amount thereof is a critical factor varying from about 0.2% to about 0.8%, with 0.4% giving commercially satisfactory results. Furthermore, other acids may be used, such as tartaric, acetic, hydrochloric, sulfuric and phosphoric acids.

The compositions in discontinuous gel form herein provide a means for controlling the quality of vapor from an evaporating mixture containing substances e. g. liquid, readily volatilizable at room temperatures, that is, the quality of the vapor is substantially constant during the period of volatilization, with the gelling substances being so proportioned as to give that effect. Also, the evaporation curve, weight-time relationship, is substantially a straight line since the segmented gel controls the evaporation or volatilization at a constant rate from a given container.

Additionally, the air treating composition in this gel form has the property that when it is exposed in a space or in an air supply flowing to a space, the liquid will evaporate from the surface of the gel and be continually replaced by diffusion from the interior thereof. Consequently, the gel will gradually decrease in liquid content until it has been substantially all evaporated and only the dry gelling agent remains.

We have found that an important factor influencing the rate of evaporation is the uniformity of diffusion of the liquid from the interior to the surface of the gel, and that such diffusion rate is substantially independent of temperature, humidity and velocity of the ambient air, hence, according control of the evaporation rate. Moreover, we have found that whichever component of the liquid may be brought to the surface, it will volatilize substantially independently of its association with other components. Therefore, the composition of the vapor arising from the gel surface depends primarily on the rate of diffusion to the surface of the various components of the liquid.

However, diffusion rates vary over a relatively narrow range, while vapor pressures vary over a relatively wide range. Consequently, a unit of liquid in the gel form will deliver approximately uniform vapor to the ambient atmosphere from the beginning to the end of volatilization. In this way, the gel form which we have developed provides definite control over the uniformity of the composition of the vapor. The gel form not only gives evaporation control of the liquid substances, but a further advantage is that the containers will be non-spillable, which renders the gel form particularly useful in the household, in sickrooms, and in the air conditioning systems of airplanes, railroad cars, buses, etc.

Also, the composition is non-inflammable and non-injurious, and it is stable and non-fractionating because the gel retains the various liquid substances in a solid mass with the treatment of air being the same throughout the life of the gel. This is due to the substantially constant evaporation rate from the gel mass, and to the substantially uniform composition of the liquid mixture diffusing to the gel surface.

The segmented gel form of composition described herein we have found affords not only control of the quality of the vapor from the volatilizing or evaporating liquid mixture, but also a control of the constancy of evaporation rate from a given container. The constancy of the evaporation rate gives a weight-time relationship which is a straight line, and in order to achieve this it is necessary that the exposed area by maintained essentially constant even though the tendency of the gel is to shrink and "case-harden" as evaporation proceeds.

Accordingly, if a mass of the gel is exposed either to natural air currents or to such as arise from a fan or a blower, the gel mass will recede and the surface will gradually drop. However, at the same time it tends to pull away from the sides of a container with the development of a curved surface in the middle, and this surface gradually becomes drier than the periphery of the surface. We have found that the tendency to recede from the sides, thus increasing the surface, may be made to counterbalance the tendency to dry on the curved surface, which decreases the effective surface area, by cutting or slicing the gel, that is, rendering it discontinuous whereby a number of small curved surfaces develop having small peripheries so that as the gel surface recedes during evaporation it acquires a waffled appearance.

The slicing or cutting is effected in any desired manner in the firm set gel from the top to the bottom thereof, with the number of cuts which may be either straight or curved depending upon the number of segments desired.

As indicated, the gel is in a form which yields an increased surface area as the volatilization of the liquid substances proceeds. The cuts which are made with any suitable sharp, thin instrument are hardly visible prior to evaporation, although if the gel is removed from the container the segments which were contiguous will immediately separate. However, as evaporation proceeds, the surface of each segment recedes from that of these immediately adjacent, thus producing the curved surfaces abovementioned.

The gels produced in accordance with our invention may be utilized for a variety of purposes as for perfumes and aromatics, for example, in dispensers for smelling salts. Further, the contents of the container will yield the same odor from start to finish and will be non-spillable. These gels may also be employed to control the rate of evaporation of inhalants and humidifiers, so that a desired mixture of aromatics will be maintained in proper balance with one another and with moisture. Furthermore, it will be realized that if the gel is to be warmed, a gelling agent should be used which will yield a thermally irreversible gel.

A further use for these gels is in the control of the evaporation of insect repellents, disinfectants and bactericides, especially when such may be in association with a perfume or an odor counteractant.

As illustrative of the additional uses the examples that follow are given; the parts are by weight.

*Example 5—Inhalant*

A composition adapted as an inhalant may be produced by preparing a mixture of menthol, creosote and tincture of benzoin in equal parts and dissolving the mixture in ethyl alcohol, 95%, to form a 10% solution. The solution thus obtained is added to an aqueous solution of agar-agar having a concentration from about 1% to about 2%, the relative proportion being 10 parts of the alcoholic solution to 90 parts of the agar solution.

The addition may suitably be made at a temperature of about 40° C. and when a uniform liquid mass has been obtained it is then poured into a suitable container wherein, upon cooling, it sets into gel form.

Example 6—Disinfectant

A gel may be produced as in Example 5 with a 10% alcoholic solution of hexyl resorcinol being utilized in place of the alcoholic solution containing menthol, creosote and tincture of benzoin.

Example 7—Perfume

A pleasant odorous composition may be prepared by first producing an aqueous solution containing 1-2% of agar-agar and adding to about 100 parts of this solution about 2 parts of oil of lavender, i. e., lavender-flower oil. The liquid mass is now placed in a suitable vessel wherein it is permitted to cool and set into gel form. Other odorous materials that may be used are oil of rose, oil of geranium and irone (violet).

The gels prepared in accordance with Examples 5, 6 and 7 may be used as such, may be comminuted if desired, or may be segmented in the manner described in Example 1. Moreover, commercial chlorophyll may be added to the alcoholic solutions of Examples 5 and 6 in an amount such that the solution will contain about 17% of the commercial chlorophyll (about 1.7% of the final aqueous-alcoholic solution), and in Example 7 it may be added to the composition in an amount such as will provide a concentration thereof of about 1.7%.

It may be added that the evaporating surface of the discontinuous gel is maintained substantially constant through contraction of the spent portions of the segments and valleys open between the segments which continually expose new evaporating surfaces. Our finding has been also that the evaporation rate is substantially constant until 85-90% of the gel has evaporated. The rate then decreases practically to zero, with a residue of about 5% remaining, which is the non-volatile constituent or constituents of the gel.

It will be understood that the term "chlorophyll" is used herein to designate not only the chemical substance referred to as chlorophyll and which is considered to contain chlorophyll $a$ ($C_{55}H_{72}O_5N_4Mg$) and chlorophyll $b$ ($C_{55}H_{70}O_6N_4Mg$)

but also the chlorophyll of commerce which is an extract of chlorophyllic plants, and various compositions which are modifications, derivatives, decomposition products or combinations of chlorophyll. Further, the chlorophyll may contain copper in order to preserve its color.

Since certain changes in carrying out the above methods and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described our invention, what we claim as new and desire to secure by Letters Patent is:

1. An aqueous air treating gel adapted for introducing into air a uniform quality vapor mixture, said gel consisting essentially of 96 to 99% of an aqueous medium of which 1 to 10% comprises a plurality of volatile air treating components which are compatible, uniformly dispersible in water, and which normally volatilize at different rates at room temperature, and 1 to 4% of an aqueous gelling agent, the amount of gelling agent present in proportion to the aqueous medium being such that the gel is firm and substantially devoid of syneresis.

2. An air treating gel as defined in claim 1 wherein the liquid medium is an aqueous-alcoholic medium.

3. An air treating gel as defined in claim 1 wherein the gelling agent is agar-agar.

4. An air treating gel as defined in claim 1 wherein the gelling agent is a calcium alginate.

5. An air treating gel as defined in claim 1 in which a body of gel is segmented to expose fresh surface areas of gel during evaporation, whereby as the gel gradually shrinks in volume the exposed surface area is maintained substantially constant by gradual separation of the segments so that said constant quality vapor mixture is emitted at a substantially constant rate.

References Cited in the file of this patent

UNITED STATES PATENTS

| Number | Name | Date |
|---|---|---|
| 2,089,612 | Kubelka | Aug. 10, 1937 |
| 2,373,198 | Roerich | Apr. 10, 1945 |
| 2,441,729 | Steiner | May 18, 1948 |
| 2,465,470 | Omohundro et al. | Mar. 29, 1949 |

FOREIGN PATENTS

| Number | Country | Date |
|---|---|---|
| 130,100 | Australia | Nov. 18, 1948 |

OTHER REFERENCES

Lesser, Soap and Sanitary Chemicals, May 1947, pp. 131, 133, 135, 137, 151.

Drug and Cosmetic Industry, September 1949, p. 336.

Howard, Sheets 1 and 2, from the Economic Dept. of the State Sero-Therapeutic Institute in Vienna (1931).